(12) United States Patent
deVries

(10) Patent No.: US 6,223,830 B1
(45) Date of Patent: *May 1, 2001

(54) METHOD OF HARVESTING SOD

(75) Inventor: Roelof H. deVries, Dalton, OH (US)

(73) Assignee: Steiner Turf Equipment, Inc., Dalton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/385,973

(22) Filed: Aug. 30, 1999

Related U.S. Application Data

(63) Continuation-in-part of application No. 09/115,858, filed on Jul. 15, 1998, now Pat. No. 6,056,064.

(51) Int. Cl.$^7$ ................................................. A01B 95/04
(52) U.S. Cl. .................................................. 172/19; 172/1
(58) Field of Search .................................. 172/19, 20, 33; 47/56; 414/911, 739.7; 190/308.1; 111/901

(56) References Cited

U.S. PATENT DOCUMENTS

| | | |
|---|---|---|
| Re. 34,827 | 1/1995 | Dover et al. . |
| 3,590,927 | 7/1971 | Brouwer et al. . |
| 4,832,130 | 5/1989 | Brouwer et al. . |
| 5,775,436 | 7/1998 | Noyes, II et al. . |

*Primary Examiner*—Robert E. Pezzuto
(74) *Attorney, Agent, or Firm*—Dean W. Russell; Geoff L. Sutcliffe; Kilpatrick Stockton LLP

(57) ABSTRACT

A method of harvesting sod using a sod harvester involves the formation of a series of defined slabs of sod that are positioned end-to-end, and conveyed up a conveyor that is driven at ground speed so that the slabs stay together. The slabs may be defined by respective series of spaced perforations so that the slabs remain connected by portions of the sod between the perforations. Where the slabs are completely separate, netting is introduced continuously below the series of slabs as they enter a roll-forming enclosure of the harvester. The netting keeps the slabs together and allows them to be formed into a roll in essentially the same fashion as a continuous strip of sod. Roll formation is continued until a large diameter roll has been formed comprising multiple layers of sod slabs. The large roll forms a unitary structure that can be manipulated and transported to a laying site in the same manner as a large single strip roll. At the site, the roll can be tipped onto its side, permitting individual slabs of sod to be pulled away from the roll and carried off for laying.

7 Claims, 14 Drawing Sheets

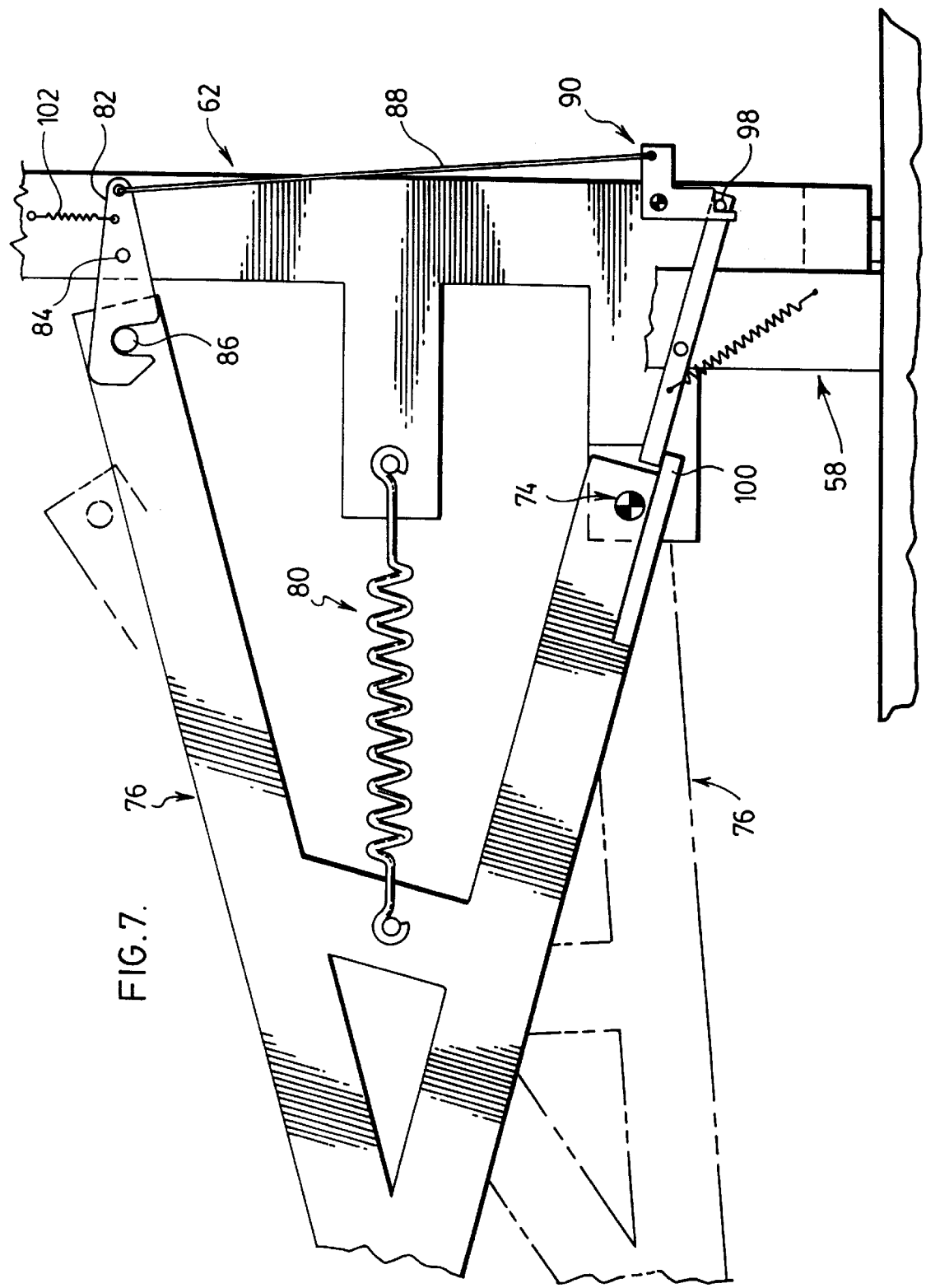

FIG.13.
FIG.12.
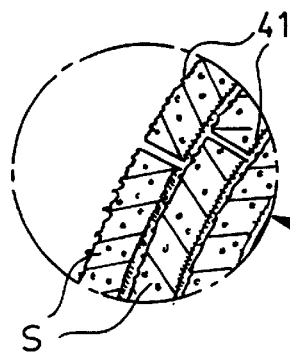
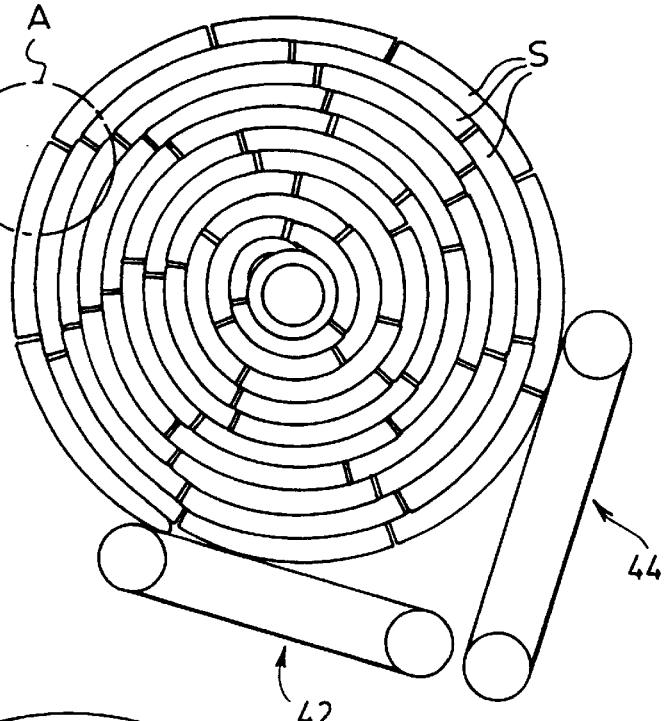
FIG.14.
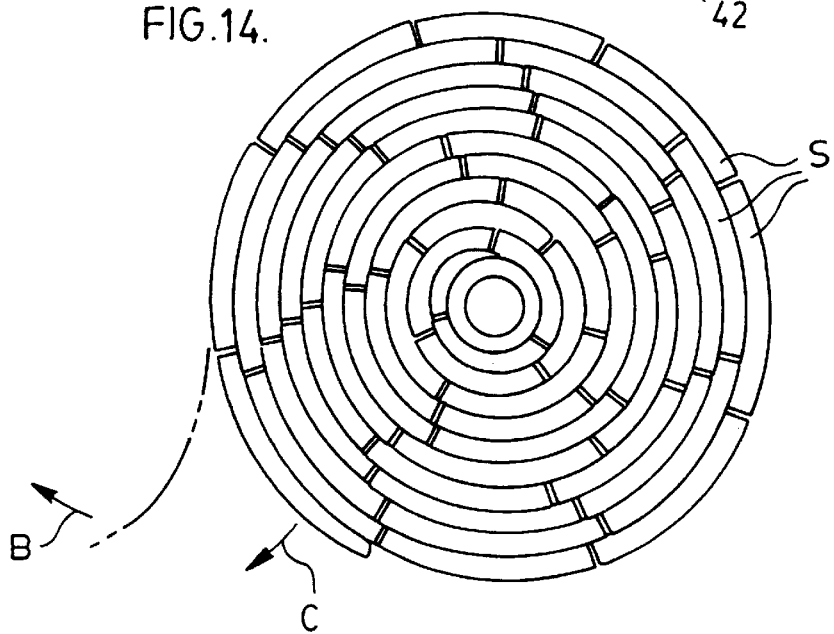

METHOD OF HARVESTING SOD

CROSS REFERENCE TO RELATED APPLICATIONS

This application is a continuation-in-part of U.S. patent application Ser. No. 09/115,858 filed Jul. 15, 1998, now U.S. Pat. No. 6,056,064, and discloses improvements of the invention of U.S. patent application Ser. No. 08/686,555 filed Jul. 26, 1996, now U.S. Pat. No. 5,775,436 issued Jul. 7, 1998.

FIELD OF THE INVENTION

This invention relates to a method of harvesting sod using a sod harvester; that is, a machine for cutting strips of sod from the ground and automatically forming those strips into rolls.

BACKGROUND OF THE INVENTION

A sod harvester usually has a horizontal blade which severs the sod from the ground at the desired thickness, in combination with two vertical side blades which cut the sod to the desired width. Thus, a continuous strip of sod is formed as the harvester travels along its cutting path. A vertical cutter blade periodically is driven into the sod adjacent the undercutting blade to sever the strip to length.

As the strip of sod is cut, it is conveyed away from the cutter blade, usually up an inclined conveyor, for forming into rolls. U.S. Pat. No. 3,509,944 (Brouwer et al.) discloses a prior art sod harvester which includes such an inclined conveyor, and in which the rolls of sod are formed adjacent the upper end of the conveyor. The sod harvester disclosed in the '944 patent is designed to be mounted at the side of a farm tractor, by which the harvester is propelled.

U.S. Pat. No. 4,832,130 (Brouwer et al.) discloses a self-propelled sod harvester. In this case, the harvester also includes an inclined conveyor but in this case, the strip of sod is delivered by the conveyor into a separate roll-forming enclosure which includes a pair of conveyors disposed generally at right angles to one another, for forming the roll. The formed rolls are discharged onto a cart at the end of the harvester which can convey the formed roll to either side of the cart and clear of the harvester on its next pass. The '130 patent also discloses a curved conveyor for discharging formed rolls clear of the harvester.

U.S. Pat. No. Re. 34,827 (Dover, et al.) discloses a method of and apparatus for cutting sod in which a sheet of netting is inserted into the sod roll as it is formed.

The disclosures of U.S. Pat. Nos. 3,509,944, 4,832,130 and Re. 34,827 are incorporated herein by reference.

Large rolls of sod produced by sod harvesters can be difficult to handle. For example, a large roll may be, say, four feet in diameter and, accordingly, will be relatively heavy. Mechanical equipment such as forklift trucks are required to handle and transport the rolls. At the site at which the sod is to be laid, the roll must be appropriately positioned and oriented so that it can be unrolled where the sod is required to be laid. Manipulating and moving the sod after it has been unrolled can be difficult.

Other methods of harvesting and handling sod include formation of small rolls or slabs of sod that are stacked and transported on pallets. While these methods are not as efficient in terms of manpower as methods in which the sod is harvested in large rolls, they do have the advantage that the individual rolls or slabs can easily be handled at the laying site and manoeuvred into place.

SUMMARY OF THE INVENTION

It is an object of the present invention to provide an improved method of harvesting sod that combines the advantages of various prior art methods.

The method of the invention involves the provision of a sod harvester which includes cutter means for forming a strip of sod as the harvester travels along a cutting path, and sod roll-forming means to which the strip of sod is delivered from the cutter means and which is adapted to form the strip of cut sod into a roll. A strip of sod is formed by causing the sod harvester to travel along the cutting path. The sod is perforated transversely with respect to the cutting path at intervals selected to form the strip into a series of defined end-to-end slabs of sod. The series of slabs of sod is delivered to the roll-forming means and formation of the roll is continued until the roll comprises a unitary structure of multiple layers of slabs of sod. This structure can be handled and transported to a laying site as a unit, and slabs can be removed individually from the structure for laying.

The invention combines the efficiency of mechanically forming sod into a large roll that can be handled and transported as a unit, with the ease of handling and manipulation of the sod at the laying site that is possible with small slabs of sod. A minimum of manual labour is required to form the rolls. The rolls can be transported and handled using forklift trucks or the like. At the laying site, the large roll can be tipped onto its side (so that the axis of the roll is generally upright) and the individual slabs of sod removed from the roll, transported and laid by hand.

The step of perforating the strip of sod transversely can be performed so as to completely sever the strip and form discrete slabs of sod. Alternatively, a series of separate perforations can be formed transversely of the strip so as to leave portions of the strip between the perforations that inter-connect successive slabs of sod. The perforations will be spaced and sized according to the strength of the sod so that the inter-connecting portions are adequate to maintain the integrity of the strip of sod during formation of the roll and subsequent transportation and handling of the roll.

In an embodiment in which the strip of sod is completely severed so as to form discrete slabs of sod, a wrapping material is continuously introduced in advance of the roll-forming means against the surface of the series of slabs of sod that will form the outer side of the roll in the roll-forming means. The formed roll then comprises a unitary structure of multiple layers of slabs of sod wrapped in the wrapping material. At the laying site, the wrapping material can easily be peeled away and the individual slabs of sod removed from the roll for laying.

Typically, the wrapping material will be a plastic netting that allows the sod to "breathe".

The rolls of sod can be formed with the dirt side out in accordance with the teachings of the U.S. patent application Ser. No. 08/686,555 (the '555 application), or with the grass side out as disclosed in U.S. Pat. No. 4,832,130 (supra). The netting or other wrapping material is applied to whichever side of the series of slabs of sod will be at the exterior of the roll. In the case of the sod harvester of the '130 patent, therefore, the netting would be applied to the grass side of the slabs.

In this context, it is to be understood that the method of the invention is not restricted in its application to the sod harvester of either the '555 application or the '130 patent mentioned previously. Where the method is used with a harvester as disclosed in the '555 application, the roll-forming means need not comprise a pivotal roll-forming unit as disclosed in that application.

Preferably, the roll-forming means includes first and second linear conveyors arranged at a substantial angle with respect to one another so that the second conveyor in use causes the leading end portion of a leading slab in the series of slabs to tend to turn back on itself for forming a roll.

Preferably, the harvester also includes an intermediate conveyor that is inclined upwardly from the cutter means of the harvester to the roll-forming means, and the conveyors are driven at ground speed as disclosed in the '130 patent (supra) so that the slabs stay together with no spacing or only minimal spacing therebetween as they are formed into a roll.

BRIEF DESCRIPTION OF DRAWINGS

Background

FIGS. 1 to 9 of the accompanying drawings illustrate the sod harvester of the '555 application and are referred to as an example of the sod harvester that may be used to practise the method of the invention. In these views:

FIG. 1 is a diagrammatic side elevational view illustrating the principal components of a sod harvester in accordance with the invention;

FIG. 2 is a diagrammatic plan view corresponding to FIG. 1, showing the harvester coupled to a farm tractor;

FIG. 3 is a perspective view of the roll-forming enclosure sub-assembly in position for receiving an in-coming strip of sod;

FIG. 4 is a view similar to FIG. 3 showing the roll-forming enclosure in a discharge position;

FIG. 5 is a detail view illustrating spring-biassed fingers that are used in association with the second conveyor of the roll-forming enclosure;

FIG. 6 is a partially exploded perspective view from the opposite side as compared with FIGS. 3 and 4, illustrating an arrangement for providing the sod roll with a net wrap;

FIG. 7 is a diagrammatic illustration of a linkage that is used to effect "dumping" of a completed roll of sod from the harvester;

FIG. 8 comprises views denoted 8a) and 8b) illustrating a stop mechanism used in association with the roll-forming enclosure; and, FIG. 9 is a diagrammatic illustration of a core tube dispenser forming part of the harvester.

The Invention

Figure 1:
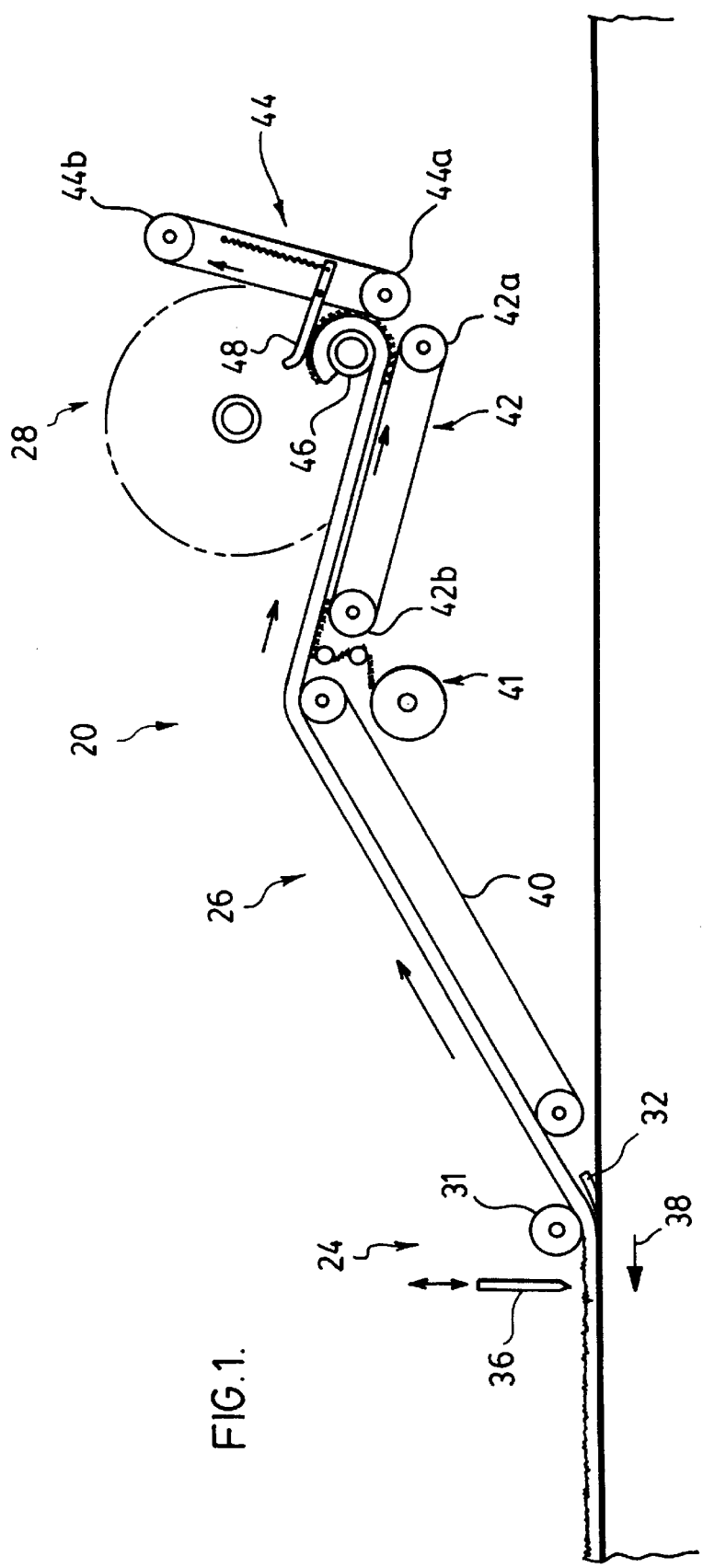
Figure 10:
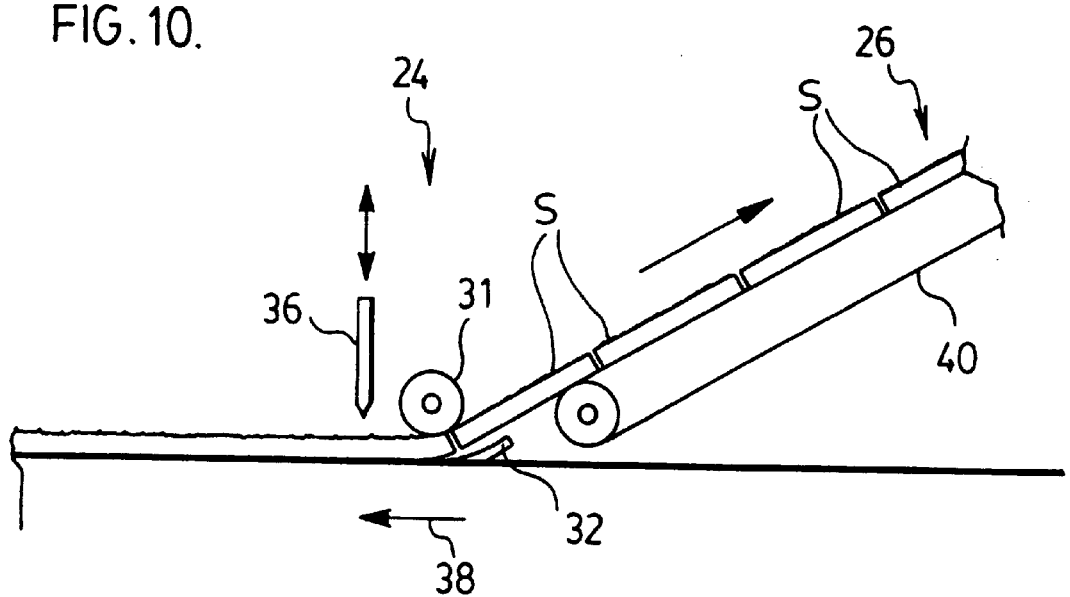
Figure 11:
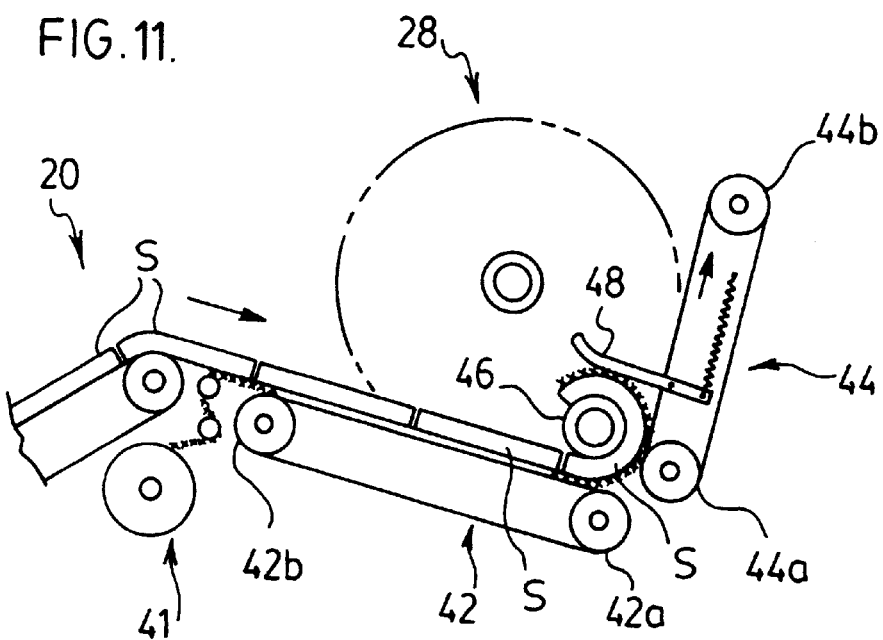
Figure 15:
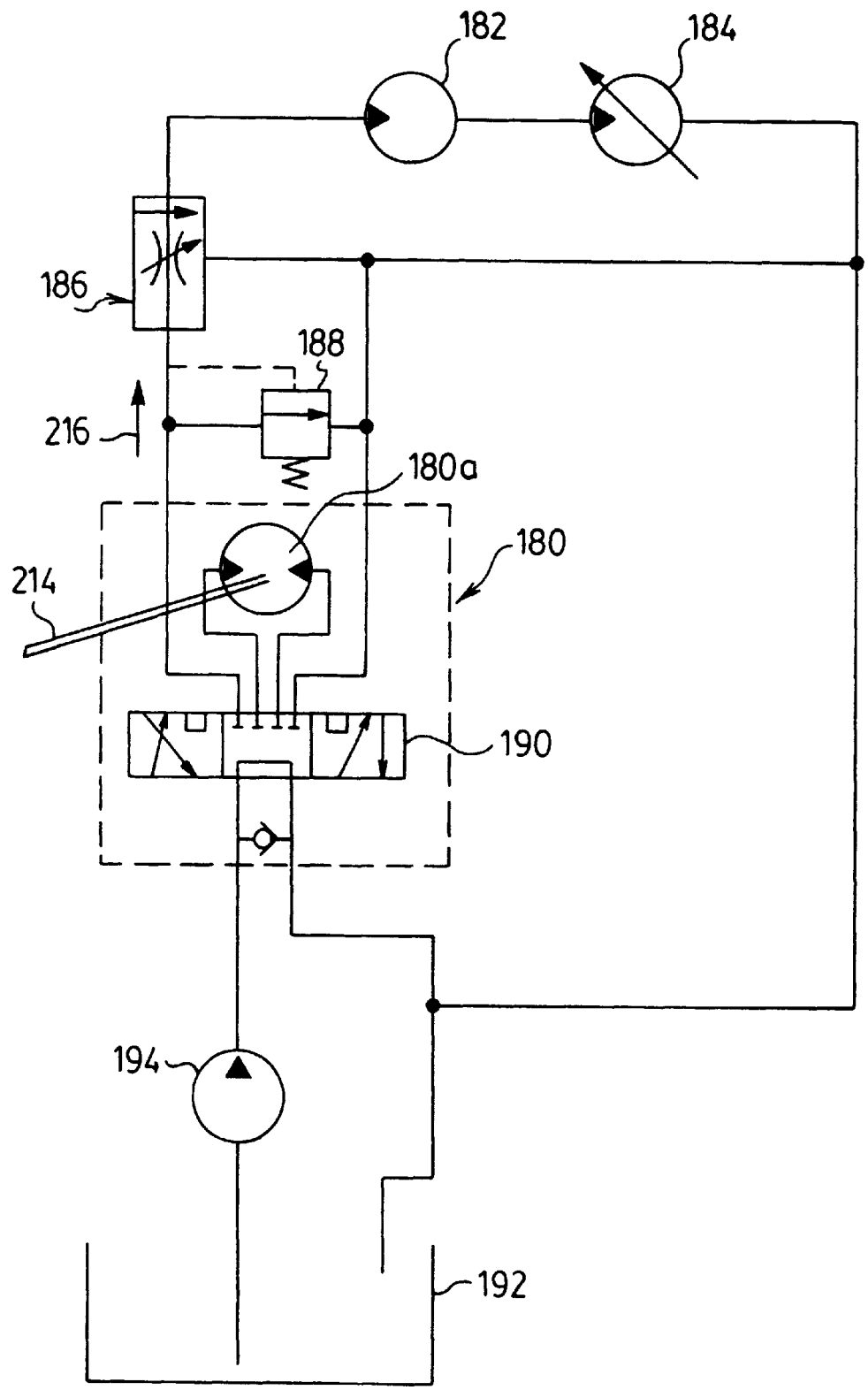
Figure 16:
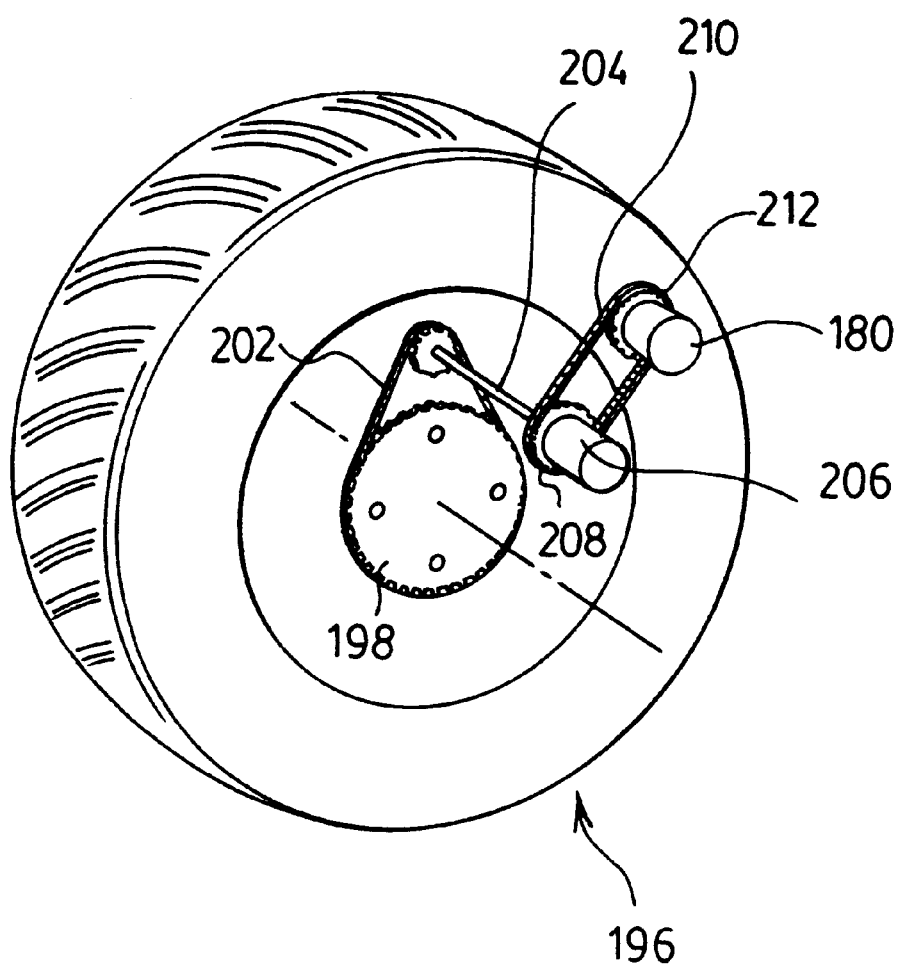
Figure 17:
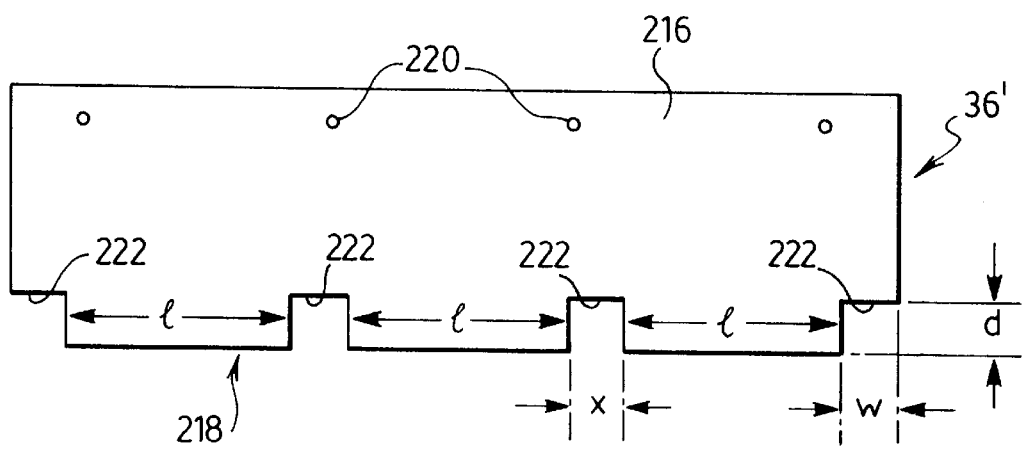
Figure 18:
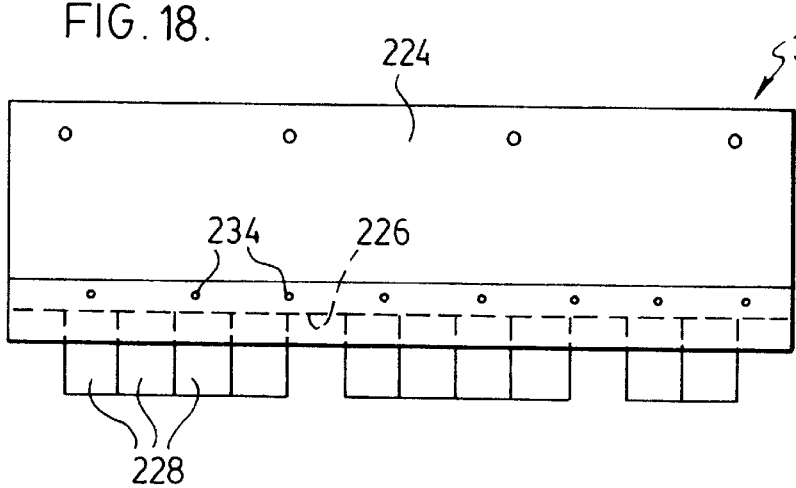
Figure 19:
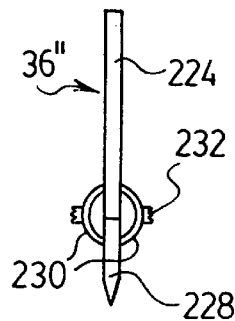

In order that the present invention may be more clearly understood and readily carried into effect, reference will now be made to the accompanying drawings which illustrate a preferred embodiment of the invention by way of example, and in which:

FIG. 10 is a diagrammatic side elevational view similar to part of FIG. 1 and illustrating the formation of individual slabs of sod in accordance with the present invention;

FIG. 11 is a diagrammatic side elevational view showing formation of a roll of slabs of sod in the roll-forming means of the sod harvester;

FIG. 12 is a diagrammatic side elevational view of the roll-forming means of FIG. 11, showing the roll formed to its full size;

FIG. 13 is an enlarged detail view of the part of FIG. 12 that is circled at A;

FIG. 14 is a plan view of the roll of sod as it would appear at a laying site;

FIG. 15 is a schematic illustration showing the principal elements of an hydraulic conveyor ground speed control system;

FIG. 16 is a diagrammatic illustration of a method of driving an hydraulic metering valve of the system of FIG. 15;

FIG. 17 is an elevational view showing a cutter blade for forming a series of separate, spaced perforations in a strip of sod, in accordance with a further aspect of the invention;

FIG. 18 is a view similar to FIG. 17 showing an alternative form of cutter blade that includes a series of individual blade segments; and, FIG. 19 is an end elevational view corresponding to FIG. 18.

DESCRIPTION OF FIGS. 1 TO 9

Figure 2:
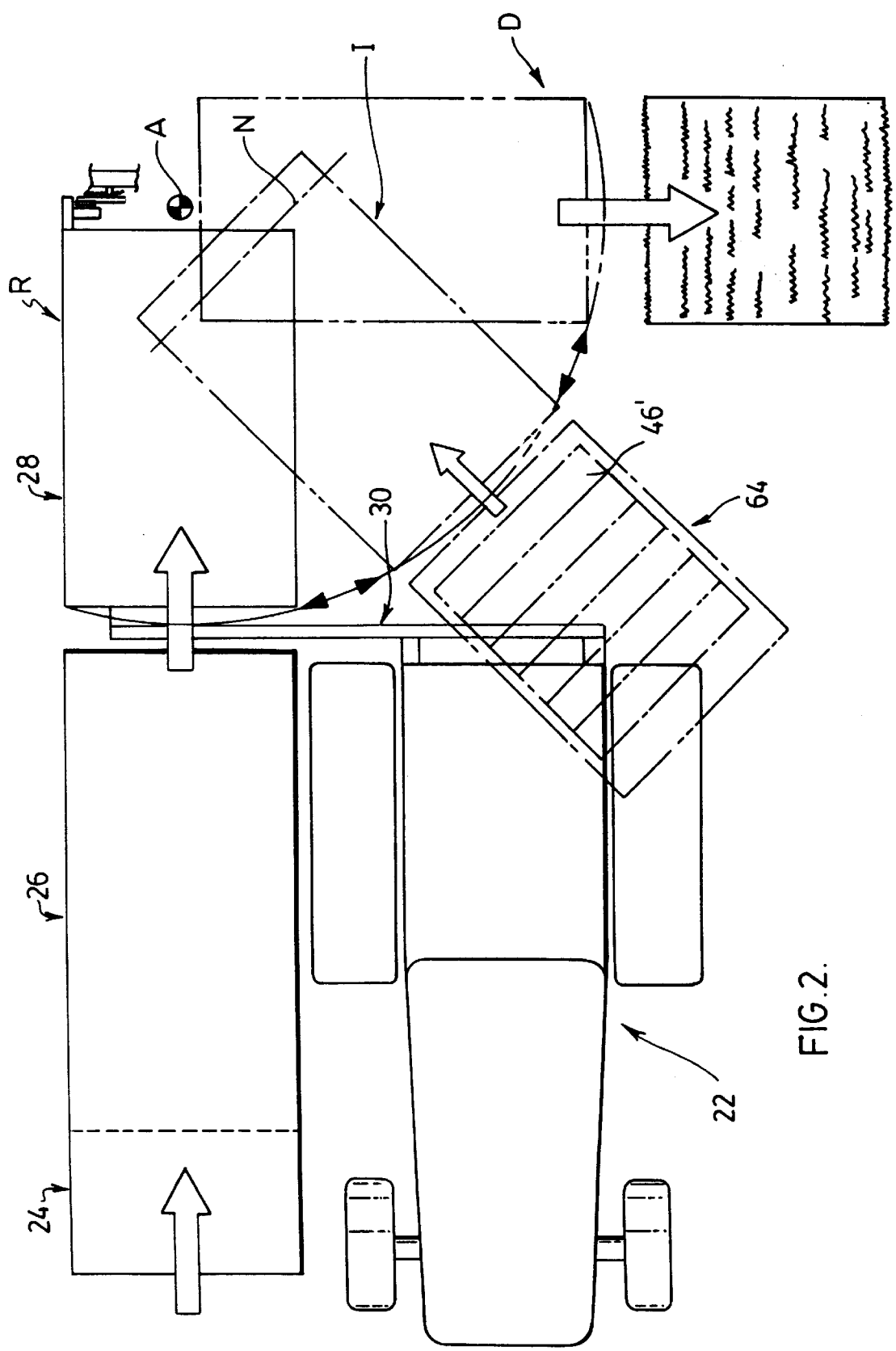

Referring first to FIGS. 1 and 2, a sod harvester in accordance with the '555 application is generally denoted by reference numeral 20 and is shown (in FIG. 2) mounted alongside a conventional farm tractor 22 that serves as a propulsion vehicle for the harvester. The harvester itself essentially comprises three parts, namely a sod cutter sub-assembly which is generally denoted by reference numeral 24, a conveyor sub-assembly 26 which conveys the cut sod away from the cutter assembly, and a roll-forming sub-assembly 28 which receives the cut sod, forms it into rolls and discharges the rolls as will be described. In this particular embodiment, the roll-forming sub-assembly 28 is designed as a wheeled cart that is pivotally coupled to a frame 30 extending laterally to the right hand side of the tractor 22 (FIG. 2). The sod cutter subassembly 24 and the conveyor sub-assembly 26 have a common frame (not shown) which is pivoted at its rear end on frame 30 and supported at its front end on a ground roller 31 generally in the manner disclosed in the '944 patent (supra). An adjustable hoist (not shown) carried by the tractor allows the sod cutter sub-assembly to be raised and lowered.

Figure 3:
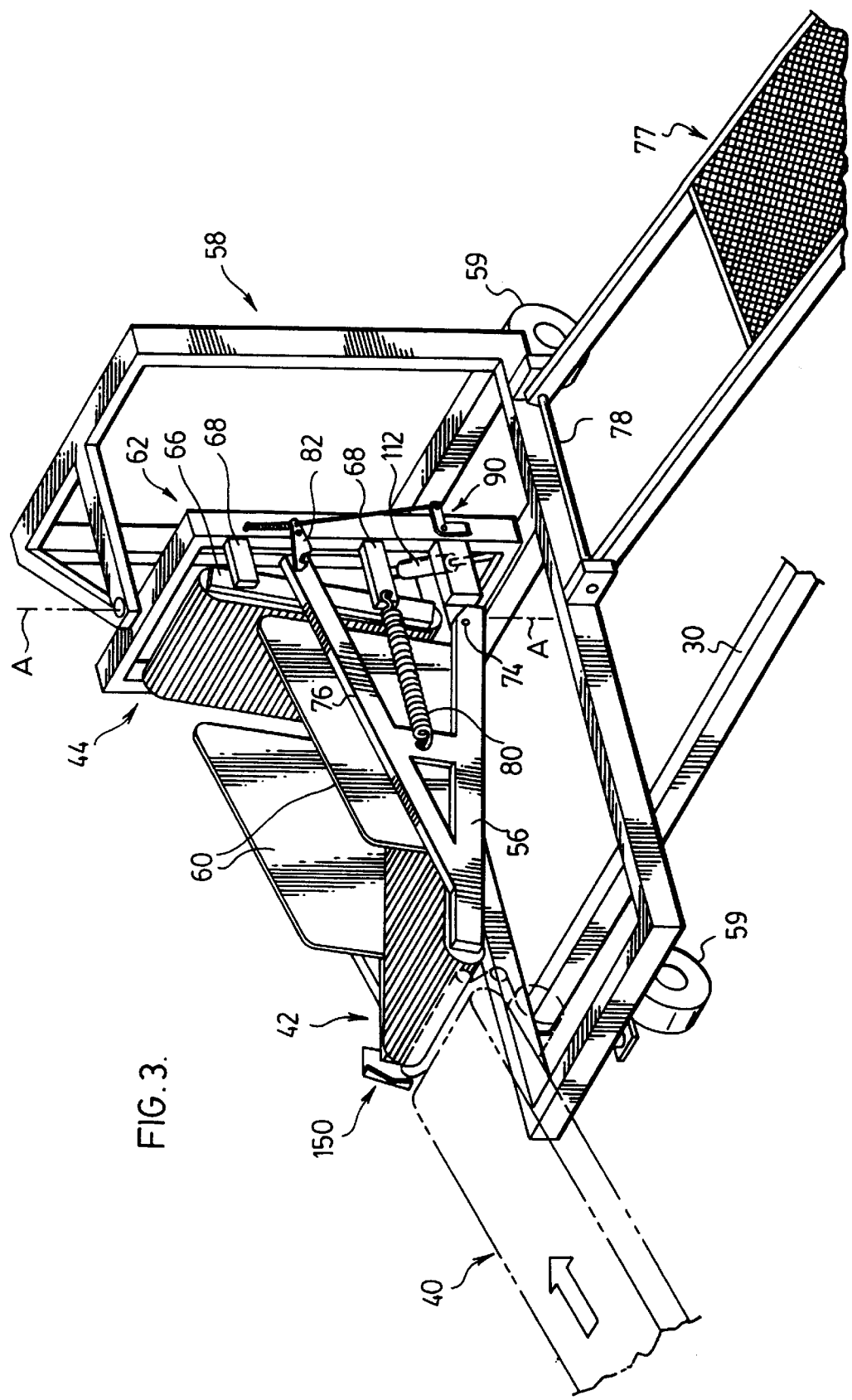
Figure 4:
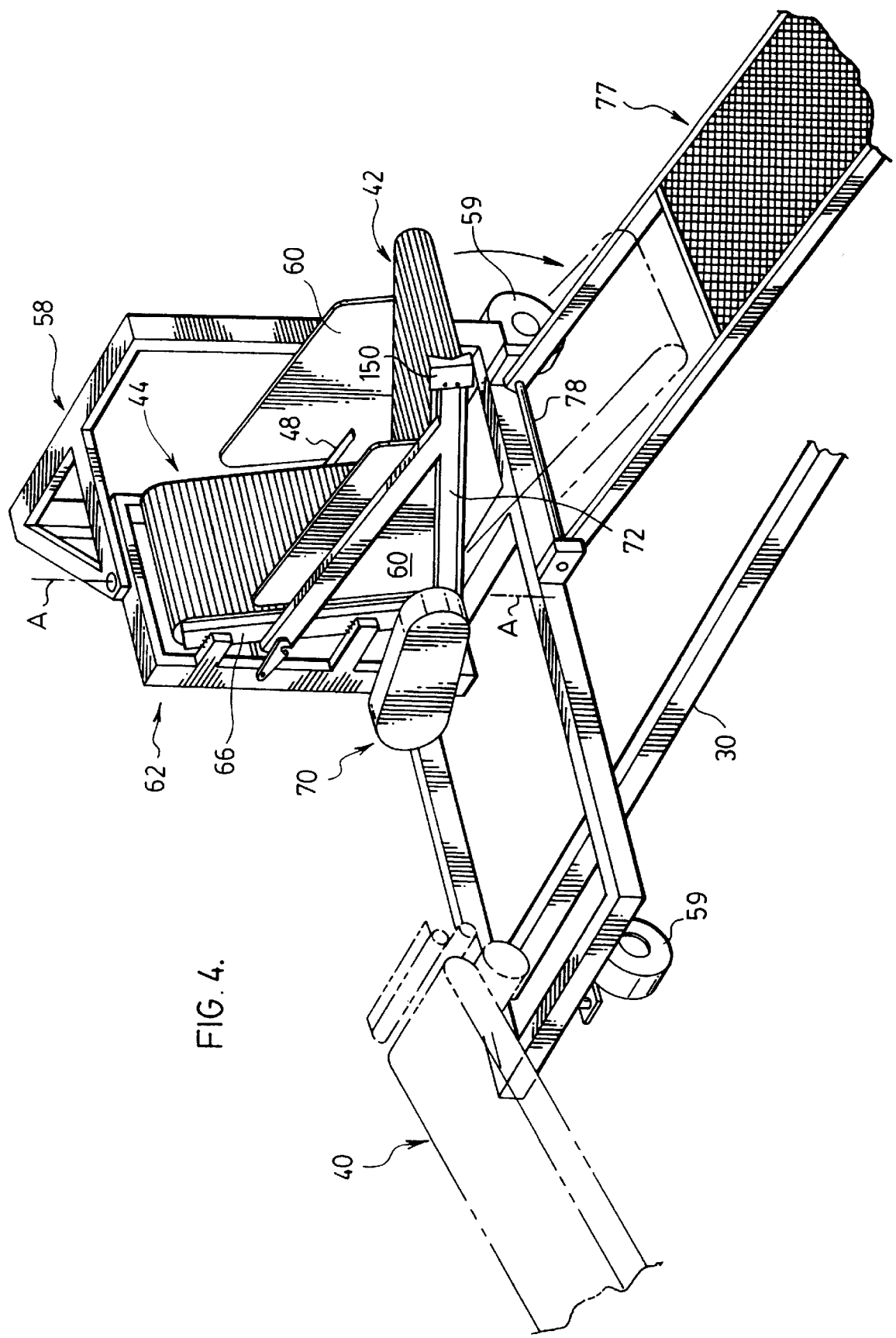

The roll-forming sub-assembly 28 is shown separately in some detail in FIGS. 3 and 4 (to be described).

Referring back to FIG. 1, the cutter sub-assembly 24 comprises an undercutting blade 32 which works in association with roller 31, and a vertically movable cutter blade 36 for cutting the strips of sod to length. Details of the cutter assembly 24 do not form part of the present invention and will therefore not be described in detail. It may be constructed as described in the '944 and/or '130 patent. For the purposes of the present invention, suffice it to say that the undercutting blade 32 severs the sod from the ground at the desired thickness as the sod harvester travels along a cutting path (generally indicated by reference numeral 38). Blade 32 will include or will be associated with vertical blade elements at its ends for cutting the sod to width (typically 24 inches). The blade may be reciprocated laterally and/or longitudinally to assist the cutting action. Blade 36 is a simple cutter blade that is driven into the sod at timed intervals by springs (not shown) to cut the strips of sod to length. Reference may be made to the '944 and '130 patents (supra) for details of these parts of the machine.

The conveyor sub-assembly 26 comprises a simple belt conveyor 40 which is arranged in an inclined position with its leading end immediately behind the cutter blade 32, so that the leading end of a strip of sod cut from the ground will travel naturally from the cutter blade onto to the top run of the belt, by which it will be conveyed upwardly and into the roll-forming sub-assembly 28. Immediately below the upper end of the belt conveyor 40 is a support for a roll of netting indicated at 41, which can be used to wrap the sod if desired. This part of the harvester is illustrated in more detail in FIG. 6, which will be described later.

The roll-forming subassembly 28 comprises first and second linear conveyors 42 and 44 each having an inner end and an outer end (42*a*, 42*b*; 44*a*, 44*b*), and being operable to convey sod between the said ends. The first conveyor 42 is arranged to receive a leading end portion of an in-coming strip of cut sod and to convey that strip towards the second conveyor 44. It will be seen that the conveyors are arranged with their inner ends (42*a*, 44*a*) adjacent one another and at a substantial angle with respect to one another (e.g. approximately a right angle). In the illustrated embodiment, the first conveyor 42 is generally horizontal but inclined slightly downwardly towards its inner end 42*a*, for assuring smooth and buckle-free transport of a strip of sod from the inclined conveyor 26 into the roll-forming sub-assembly.

The conveyors 42 and 44 are identical belt conveyors. When a roll of sod is being formed, the conveyors are driven so that their top runs move in the directions indicated by the arrows in FIG. 1, i.e. so that the leading end portion of the strip of sod is directed by conveyor 42 towards conveyor 44 and is then lifted by conveyor 44 so that it will tend to turn back on itself and form a roll. In some circumstances, it will be desirable to form the roll around a rigid core as shown at 46 in FIG. 1, though a core is not always used.

In order to assure formation of a good tight roll, the second conveyor 44 is provided with abutment means in the form of a pair of spring biassed fingers, one of which is indicated at 48 in FIG. 1. The fingers engage marginal portions of the roll of sod at oppose sides of the belt of conveyor 44 and are arranged to obstruct travel of the leading end portion of the strip along the second conveyor means and ensure that the leading end portion of the strip does turn back on itself and begin to form a roll. As will be described in more detail later, the fingers 48 are pivotally mounted and spring biassed downwardly at their outer ends, so that they are deflectable as the roll of sod grows. In other words, the fingers are pushed upwardly out of the way as the roll forms between the two conveyors, and have no effect once the roll has been started.

Figure 6:
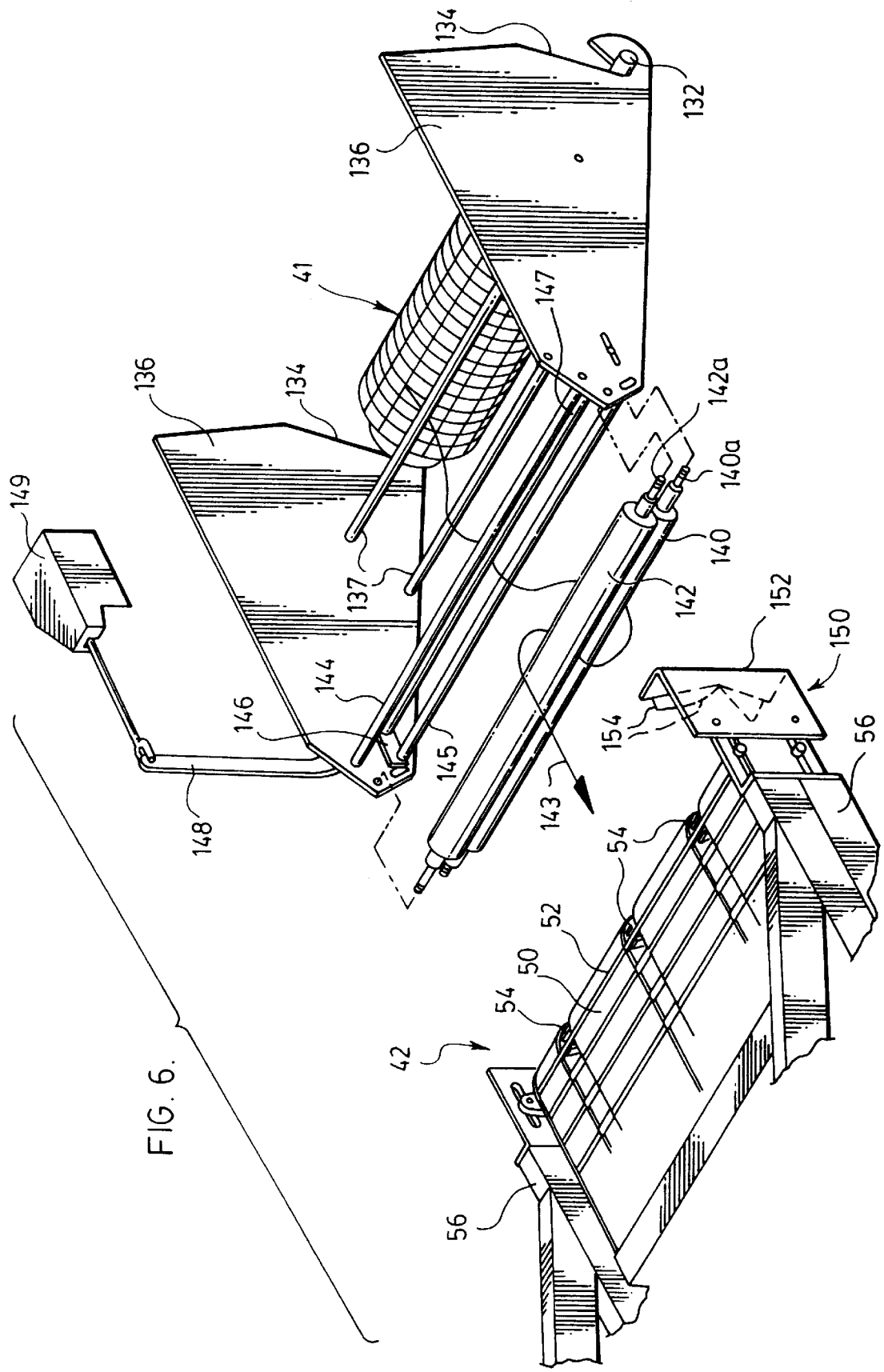

The three conveyors 40, 42 and 44 have not been shown in detail in FIG. 1 but are essentially the same as one another. Precise constructional details of the belt conveyors are not believed critical to the invention. However, for the sake of clarity, part of the outer end portion of conveyor 42 is shown in FIG. 6, from which it will be seen that the conveyor includes rubber belting 50 which incorporates transverse lugs 52 spanning longitudinal spaces in the belting. The spaces accommodate sprockets 54 that engage the lugs for positively driving the belt.

Appropriate side support members such as are typical in such conveyors are shown at 56 and again have not been described in detail since they are conventional and not significant to the invention. Conveyor 40 is driven by a hydraulic motor (not shown) through a chain drive system in a manner which may readily be realized by a person skilled in the art. Preferably, the speed at which the conveyor 40 is driven is related to the ground speed of the sod harvester. Provision may be made to adjust the speed of the conveyor, for example, so that it can move at a slightly higher linear speed than the ground speed to ensure that tension is maintained in the strip of sod.

The conveyors 42 and 44 are of essentially the same construction as conveyor 40 and are chain driven from a common hydraulic motor carried by the chassis of the roll-forming subassembly (to be described). Again, provision may be made for varying the motor speed to maintain tension in the strip of sod.

It will be seen from FIG. 3 that the roll-forming subassembly 28 has a chassis 58 which is supported on wheels 59. The two conveyors 42 and 44 form part of a unitary roll-forming enclosure including side plates 60 between which the roll of sod is formed, and which ensure that the ends of the roll are square with respect to the surface of the roll. The unit also includes an end frame 62 which is pivoted to the main chassis 58 for turning about a generally upright axis denoted A—A, so that the roll-forming enclosure can be turned between the roll-forming position in which it is shown in FIG. 3 for receiving an incoming strip of sod and forming a roll, and a discharge position shown in FIG. 4 in which the enclosure is directed laterally of the path of travel of the harvester for discharging the formed roll.

FIG. 2 diagrammatically shows this turning movement of the roll-forming enclosure. The normal roll-forming position of the enclosure is shown at R and the discharge position at D. The turning axis is indicated at A. Shown in ghost outline and denoted I is an intermediate position in which the operator of the harvester can release into the enclosure a core tube such as the tube shown at 46 in FIG. 1. In FIG. 2, a supply for the core tubes is indicated at 64. The tube denoted 46' is shown in a position prior to release into the roll-forming enclosure. In this position, tube 46' is generally parallel to a notarial axis N about which a roll of sod will be formed in the roll-forming enclosure. Details of the supply and release mechanism will be described later in connection with FIG. 9.

Referring back to FIGS. 3 and 4, the frame 62 by which the roll-forming enclosure is pivotally coupled to the chassis 58 supports side members 66 of the upright (second) conveyor 44 through brackets 68. Frame 62 also carries a support bracket for a hydraulic drive motor assembly 70 for conveyors 44 and 46 (see FIG. 4).

The lower (first) conveyor 42 of the roll-forming enclosure has side members 56 which are pivotally coupled at their inner ends to the frame 62, about a horizontal axis indicated at 74. The side plates 60 are coupled to the conveyor side members 56 by supports 76 but are free of connection to the conveyor 44 or frame 62. The pivotal mounting of the conveyor side members 56 allows the lower conveyor 42 to be inclined downwardly towards its outer end so that a roll formed in the roll-forming enclosure will simply roll out of the enclosure onto the ground. The roll may be discharged directly onto the ground or onto a spring-loaded ramp 77 coupled to the chassis 58 by a pivot rod 78, for minimizing damage to the sod.

The lower conveyor 42 is normally maintained in the roll-forming position in which it is shown in FIG. 3 by a heavy duty tension spring that extends between frame 62 and the support structure for one of the side plates 60. This spring is shown in FIG. 3 at 80 and in FIG. 7. The effect of spring 80 is overcome by the weight of the sod when a full roll has been formed. In other words, the lower conveyor 42 will then incline downwardly under the weight of the sod. Once the sod roll has been discharged, the spring 80 will return the lower conveyor to its roll-forming position.

FIG. 7 shows a latch, for holding the lower conveyor in its upper position until the operator is ready to release the roll. A latch 82 is pivotally mounted on frame 62 (at 84) and engages a pin 86 on the side plate support structure 76. A chain 88 extends downwardly from latch 82 remote from pin 86 and is coupled at its lower end to one arm of a bell-crank 90 which is pivoted to frame 62 at 92.

Pivotally mounted on the main chassis 58 of the roll-forming sub-assembly (and therefore fixed with respect to the turnable roll-forming enclosure) is a lever 94 which is pivoted at 96. A pin 98 adjacent one end of lever 94 is disposed in the path of the second arm of the bell-crank lever 90 and comprises trip means which causes the bell crank lever to rotate clockwise as shown in FIG. 7 as the lever contacts the pin, pulling down on chain 88 and releasing latch 82. As the lower conveyor 42 tilts down, an abutment 100 on the relevant conveyor side member 72 lifts the end of lever 94 opposite pin 98, thereby releasing bell-crank 90 and allowing the latch 82 to return to its normal latching position under the influence of a spring 102. Thus, as the lower conveyor returns to it normal roll-forming position under the influence of spring 80, latch 82 re-engages pin 86.

Figure 5:
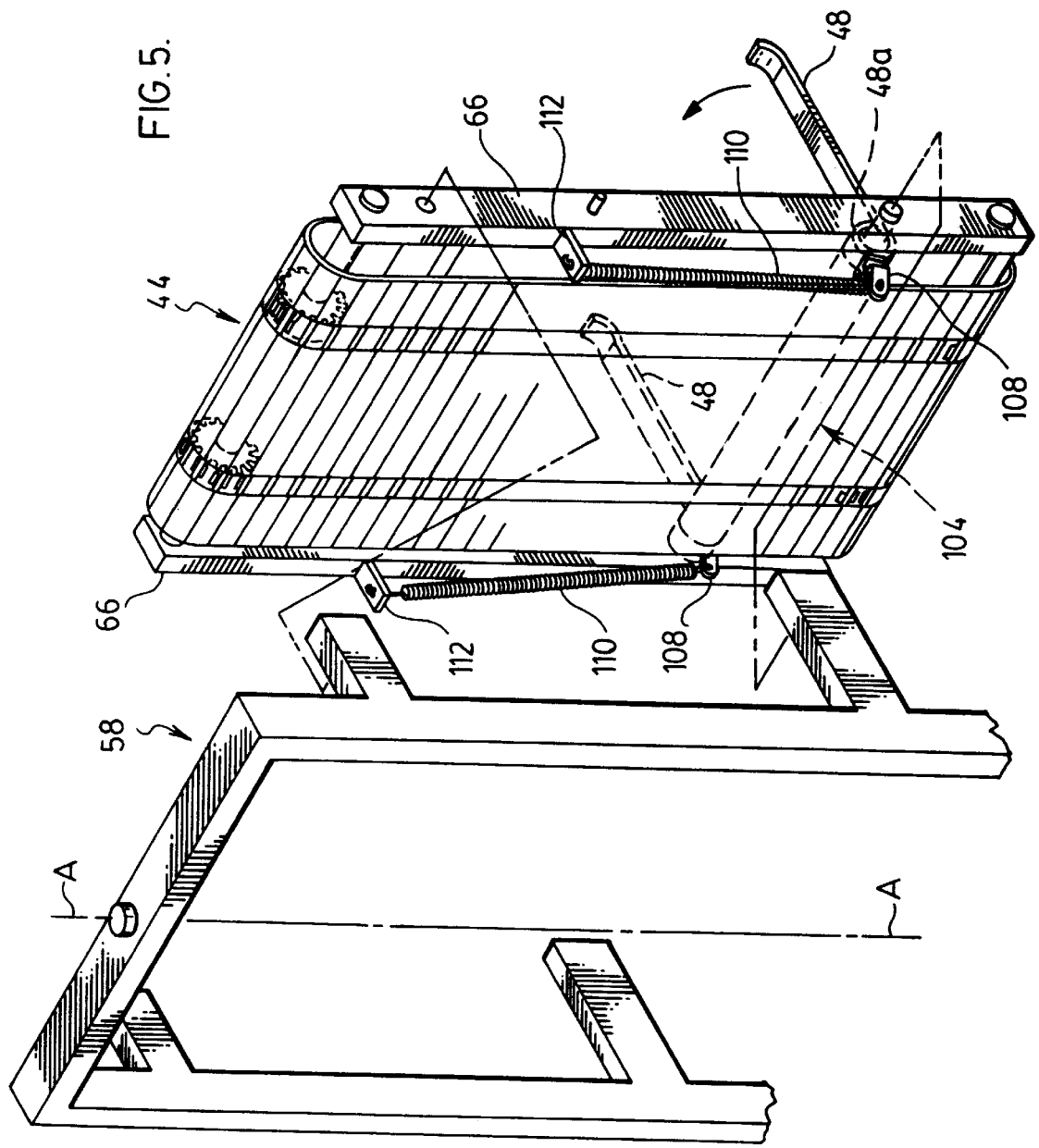

FIG. 5 shows a detail of the roll-forming enclosure, namely the two fingers 48 that are used to start the roll, as discussed previously in connection with FIG. 1. It will be seen from FIG. 5 that those two fingers are mounted outwardly of the belt of the second conveyor 44 on a pivot shaft 104 that extends between the side members 66 of that conveyor. Collars 48a at the inner ends of the respective fingers 48 are provided with brackets 108 and a tension spring 110 extends between each bracket and a further bracket 112 fixed to the relevant conveyor side member 66. Springs 110 accordingly provide the spring biassing effect for the fingers 48 and allow the fingers to be deflected as the sod roll grows.

Referring back to FIG. 3, a hydraulic cylinder 112 extends between the main chassis 58 and frame 62 and is operable to turn the frame and the roll-forming enclosure about axis A between the roll-forming position R and the discharge position D (FIG. 2) described in connection with FIG. 2.

Figure 8A:
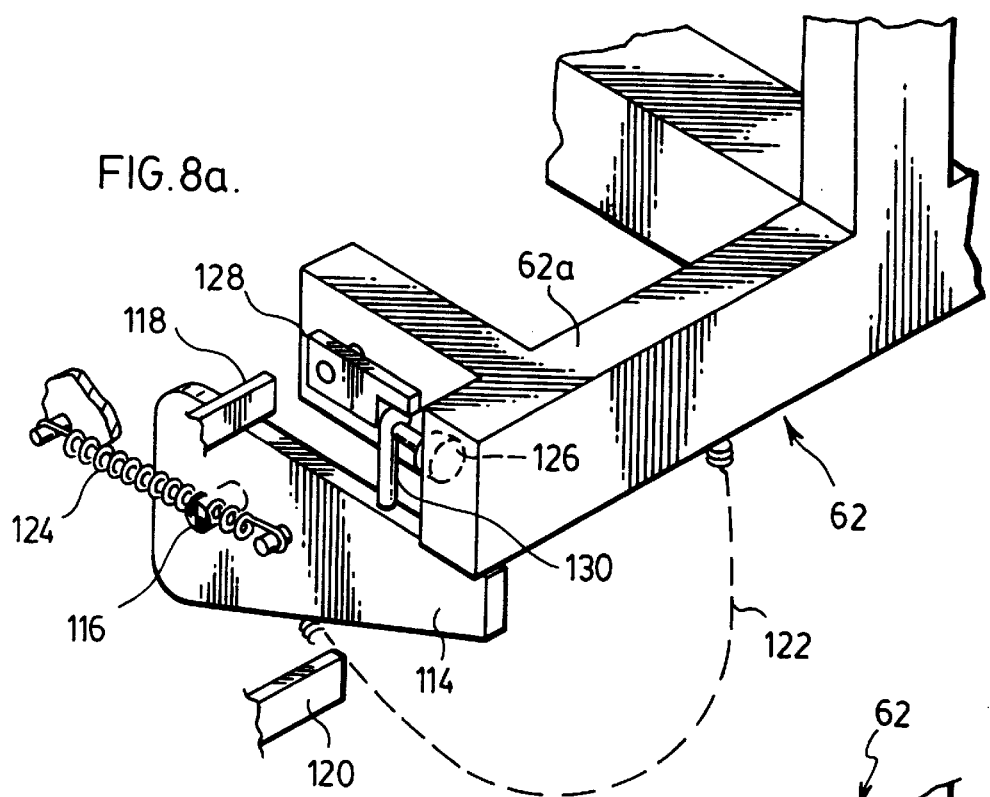

FIGS. 8a) and b) show an intermediate stop linkage that is used to automatically arrest the roll-forming enclosure in the intermediate position I (FIG. 2) for discharge of a core tube into the roll-forming enclosure. The linkage is shown in an arresting position in FIG. 8a), and in FIG. 8b), in an inoperative position clear of the roll-forming means.

The linkage includes a lever 114 which is pivoted to the main chassis 58 at 116, for movement between upper and lower stops 118 and 120. A tension spring 122 extends between the bottom edge of lever 114 and the frame 62 of the roll-forming enclosure. A further spring 124 operates over the centre of rotation of lever 114 to hold the lever against either of the two stops 118 and 120.

Figure 8B:
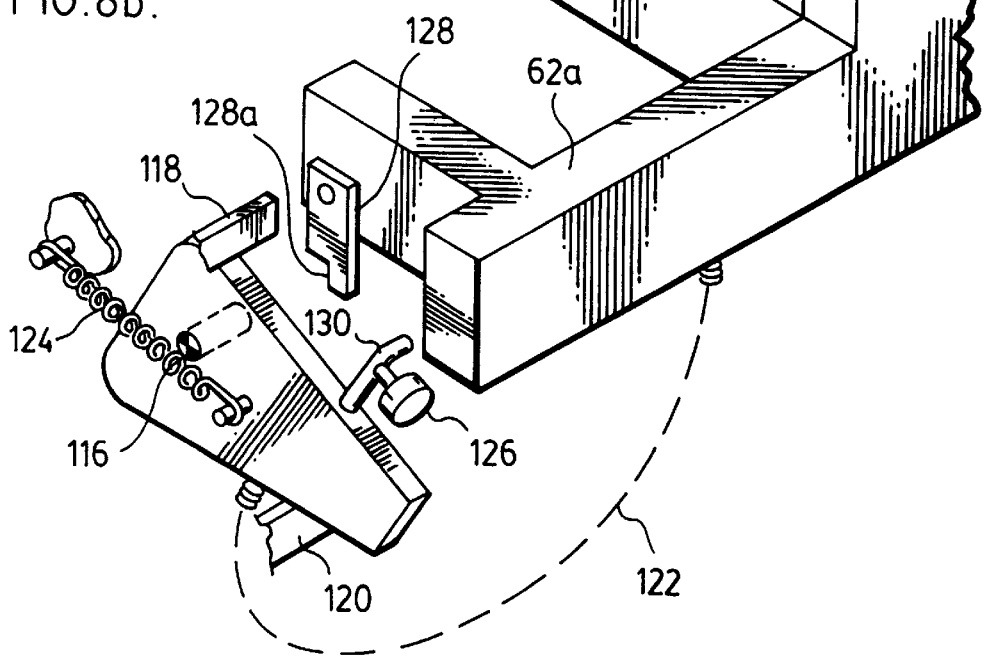

FIG. 8b) shows the lever against stop 120. In this position, the lever is clear of frame 62 so that the roll-forming enclosure is free to move from the roll-forming position to the discharge position. When the enclosure has moved fully to its discharge position, spring 122 pulls lever 114 over centre so that it moves to the position shown in FIG. 8a) in contact with stop 118. As the roll-forming enclosure turns back towards the roll-forming position and approaches the intermediate position I (FIG. 2), enclosure frame member 62a comes into contact with a bolt 126 which arrests the roll-forming enclosure in the correct position to receive a core tube 46 from the supply 64 (FIG. 2). A lever 128 carried by frame 62 is deflected upwards (counterclockwise) by a pin 130 on lever 114 until a notch 128a in the lever engages the pin 130. After a core tube has been dispensed, the roll-forming enclosure is rotated a few degrees back towards the discharge position by appropriate operator actuation of cylinder 112. This motion causes lever 128 to exert a downward force on pin 130, which in turn causes lever 114 to go over centre and come to rest on stop 120. The roll-forming enclosure can then be returned to the roll-forming position.

FIG. 6 has already been referred to in connection with the structure of conveyor 42. As noted previously, FIG. 6 also shows the roll 41 of netting that can be used to wrap the sod, for example, if the strip of sod is particularly fragile or if it is desired to provide a net wrap to facilitate subsequently handling of the roll. The roll itself is supported on a shaft or mandrel 132 that is removably received in a pair of notches 134 in a pair of side plates 136 forming part of the support frame for conveyor 40. For ease of illustration, the remainder of the frame has not been shown in detail, although a number of structural bars that extend between the two side plates 136 are shown at 137. Also extending between the side plates 136 at the extreme upper end of conveyor 40 are a pair of rollers 140 and 142 which are used to guide the netting as it is drawn off roll 41. The two rollers are mounted to turn on respective shafts 140a and 142a mounted between the side plates 136. The arrow denoted 143 shows that the netting is threaded below and around the lower roller 140, back between the two rollers and then over the top of roller 142.

When a netting wrap is required for a particular roll, the netting, after being threaded through the rollers 140 and 142, is simply placed on the upper run of the first conveyor 42 of the roll-forming enclosure and is then picked up by the conveyor and the sod so that it travels with the sod and is formed around the roll.

Upstream of the rollers 140, 142 the netting passes between a fixed clamp bar 144 and a movable clamp bar 145 that is carried at its ends on respective links, one of which is visible at 146, carried by a pivot shaft 147. An arm 148 on shaft 147 can be actuated by a solenoid 149 to move shaft 145 towards shaft 144 for clamping the netting.

A net cutter assembly 150 is mounted on the outer end of the side member 56 of conveyor 42 that will move across the path of the net as the roll-forming enclosure moves to the discharge position (i.e. the member 56 which is shown at the left in FIGS. 3 and 4. Assembly 150 includes a bracket 152 which supports a pair of cutter blades 154 that are arranged in a generally V-shaped configuration and which generally meet in the plane of the net. Thus, as the roll-forming enclosure moves from the roll-forming position to the discharge position, the blades 154 will effectively slice laterally through the net, generally in its plane, so that the net that has already been taken up by the sod will be severed from its supply. Solenoid 149 is actuated by the operator to clamp the netting at this time.

Figure 9:
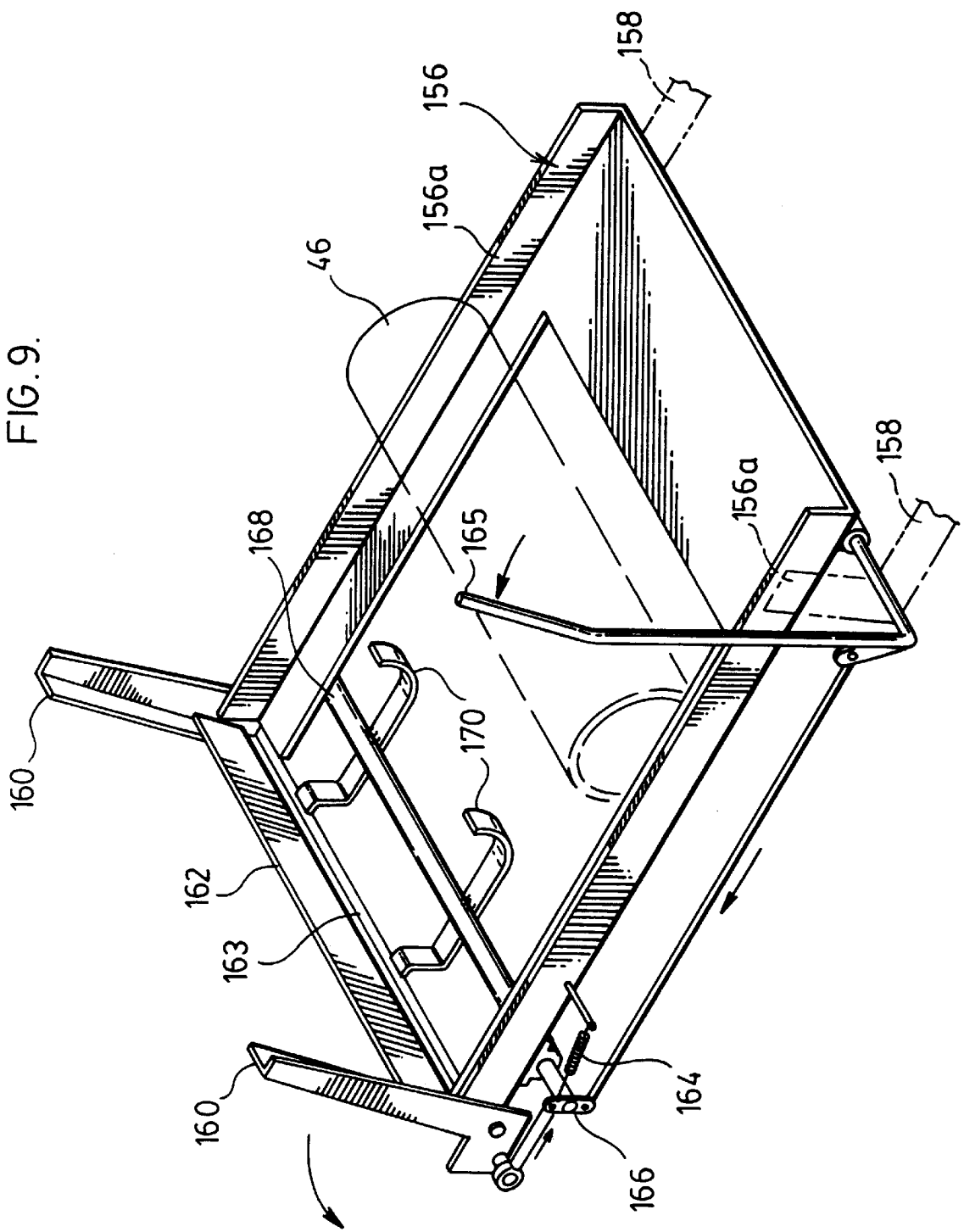

FIG. 9 shows the core tube dispenser which is indicated generally by reference numeral 64 in FIG. 2. The dispenser comprises a tray 156 which is supported by brackets 158 from the chassis of the tractor (not shown) so that the tray is slightly downwardly inclined and aligned with the lower conveyor 42 when the roll-forming enclosure is in the intermediate position I (FIG. 2). A number of core tubes (as tube 46—FIG. 1) lie transversely of the tray between respective flanges 156a along opposite sides of the tray.

As seen in FIG. 9, the left-hand end of the tray is the discharge end facing the roll-forming enclosure. A pair of arms 160 extend upwardly at opposite sides of the tray and are connected by a plate 162 that extends between the arms. The arms are pivotally mounted on a shaft 163 that extends across the end of the tray. The arms are spring-biassed to their upright positions by a tension spring 164 forming part of a linkage that extends between shaft 163 and an operator controlled release lever 165. The linkage also includes a double-arm lever 166 that is mounted on a shaft 168 extending transversely of tray 156 at a position spaced "upstream" from the end plate 162. Shaft 168 carries a pair of U-shaped elements 170 which form a "cradle" for receiving one of the core tubes prior to its release from the supply. The bottom of the tray is open in this area.

When the operator pulls on lever 165 (to the right in FIG. 9) the linkage will cause the lever 166 to turn in the counterclockwise direction as shown so that the U-shaped elements will in effect rock downwardly at their outer left-hand ends as shown, releasing a tube that was formerly cradled by the elements. At the same time, the inner ends of the elements will lift, preventing release of any additional tubes. Arms 160 will turn counterclockwise, carrying with them plate 162, so that the discharge end of the tray will no longer be obstructed and the core tube will be released to roll down the arms 160 and into the roll-forming enclosure. When the operator releases lever 165, spring 164 will return linkage to the condition shown in FIG. 9, allowing a further core tube to enter the "cradle" represented by those elements.

DESCRIPTION OF PREFERRED EMBODIMENT

FIGS. 10 to 16 illustrate the method of the invention as practised using the sod harvester of FIGS. 1 to 9. The reference numerals used in FIGS. 10 to 16 are the same as those used in the previous views. It is, however, to be understood that the invention is not limited in its application to this form of sod harvester.

As indicated previously, sod is harvested by a cutter sub-assembly 24 that cuts a strip of sod from the ground as the sod harvester travels along a cutting path. Immediately downstream of sub-assembly 24, is a conveyor 40 by which the sod is conveyed upwardly towards the roll-forming unit of the harvester. Typically, the sod will be cut to a width of about 24 inches.

A blade 36 is vertically reciprocal to cut the strips of sod to length. In accordance with the present invention, the sod is cut transversely with respect to the cutting path by blade 36 at intervals selected to form the strip into a series of discrete end-to-end slabs of sod. As compared with a harvesting method in which a large roll comprising a single strip of sod is to be formed, the blade 36 will be reciprocated much more frequently in the method of the present invention. Typically, the frequency of transverse cutting of the strip will be selected to provide slabs of between 48 and 58 inches in length. Slabs of a length in this range and 24 inches in width can be readily handled and manipulated at a laying site. Other dimensions may of course be used.

Reverting to FIG. 10, it will be seen that four individual slabs of sod "S have been cut by blade 36 and are moving up conveyor 40. Conveyor 40 is driven at the ground speed of the harvester so that the slabs of sod stay together with no or minimal spacing therebetween.

Conveyor 40 conveys the series of end-to-end slabs of sod to the conveyors 42 and 44 of the roll-forming unit of the harvester. Conveyors 42 and 44 are also driven at the ground speed of the harvester. Immediately in advance of conveyor 42, netting from a roll 41 (see also FIG. 6) is introduced to the lower (dirt) sides of the slabs "S". The netting is introduced continuously as the slabs are conveyed onto conveyor 42. The netting keeps the slabs together and prevents them falling away from the outside of the roll as it is formed in the roll-forming unit. Formation of the roll is accomplished in essentially the same fashion as described previously in that the individual end-to-end slabs of sod are in effect handled as a continuous strip. The leading end of the leading slab is conveyed by conveyor 42 towards conveyor 44 and is then moved upwardly by conveyor 44 and into contact with a pair of guide fingers 48, which cause the slab to roll and return generally horizontally and wrap around a core tube 46. As the conveyors continue to deliver further slabs of sod, the roll continues to grow and the fingers 48 move up conveyor 44 as described previously.

It is not essential to use a core tube 46. The leading slab of sod can be caused to roll back on itself without a core tube although the fingers 48 would then have to be positioned slightly differently (closer to conveyor 42).

Formation of the roll is continued until the roll comprises multiple layers of slabs wrapped in netting, as shown, for example, in FIG. 12. The roll then comprises a unitary structure which can be handled and transported to a laying site in much the same fashion as a large roll formed of a single strip of sod. FIG. 13 is a detail view of the part of FIG. 12 indicated at "A" and shows two of the outer layers of slabs "S" with the netting 41 between the layers and outwardly of the outer layer. Generally, the roll of slabs will tend to hold together without any overall binding cord or fixture for the netting, although this could be provided if necessary.

Where the sod harvester is of the form shown in FIGS. 1 to 9, the completed roll of sod will be discharged from the harvester onto the ground, in the manner described previously. The roll can then be picked up using a forklift or other mechanical lift and transported to the laying site. At the site, the roll may be tipped onto its side as shown in FIG. 14 (which is a plan view) so that the netting can easily be unwound from around the slabs (arrow "B") and the slabs removed from the roll (arrow "C") and carried away for laying.

As noted previously in connection with FIGS. 10 and 11, the inclined conveyor 40 and the two conveyors 42 and 44 of the roll-forming unit are driven at the ground speed of the harvester. FIGS. 15 and 16 illustrate one way in which this can be accomplished.

Referring first to FIG. 15, the principal elements of an hydraulic ground speed control system are shown and include a metering valve 180 which is driven from one of the wheels of the tractor 22 (FIG. 2) that serves as a propulsion vehicle for the sod harvester. The system also includes an hydraulic drive motor 182 for driving conveyor 40 and a similar, but variable speed, motor 184 for driving the two conveyors 42 and 44 of the roll-forming unit. The system also includes other conventional hydraulic components including flow control valves 186 and 188, of which valve 186 is adjustable for controlling flow of hydraulic fluid to the two motors 182 and 184. A shuttle within metering valve 180 is indicated at 190.

The system also includes a main hydraulic tank or reservoir 192 and a main hydraulic pump 194.

Referring now to FIG. 16, a wheel rim and tire assembly on tractor 22 is indicated at 196 and is seen from the inside of the rim, and omitting the hub and other parts of the tractor. For present purposes, it is sufficient to note that the hydraulic metering valve 180 (of FIG. 15) is mounted on an appropriate part of the tractor and is driven from a main sprocket 198 that is mounted to rotate with the wheel rim 200. Through a roller chain 202, sprocket 198 drives a shaft 204 that is coupled via an electric clutch 206 to a further sprocket 208. A further roller chain 210 then drives a sprocket 212 for rotationally driving the hydraulic metering valve 180. By engaging or disengaging clutch 206, the metering valve 180 is coupled to or de-coupled from the sprocket 198.

Reverting to FIG. 15, the two lines denoted 214 schematically illustrate rotational input from the chain drive arrangement of FIG. 16 to a rotor component 180a of metering valve 180. In operation, the rotational input from the chain drive of FIG. 16 to metering valve 180 causes a proportional flow of hydraulic fluid to the two conveyor drive motors 182 and 184 as indicated by arrow 216. Clearly, by appropriate calibration of the components of the hydraulic system and the chain drives of FIG. 16, the conveyors 40, 42 and 44 can be driven at the ground speed of the sod harvester, as represented by the rotational speed of the tractor tire and rim 15 assembly 196 (FIG. 16).

In the preceding embodiment, the cutter blade 36 is a conventional blade that is designed to completely sever the strip of sod and form a series of discrete end-to-end slabs of sod. As pointed out previously, within the broad scope of the invention, the strip of sod may not be completely severed by the cutter blade. A serrated or notched cutter blade can be used as blade 36 to form a series of perforations through the sod, leaving between the perforations, portions of the strip of sod that interconnect the individual slabs. In this embodiment, the blade forms defined slabs in the sense that the perforations define lines of weakness in the strip of sod that can be broken to separate the individual slabs. However, at this stage, the slabs are not discrete in the sense of being separate from one another.

A cutter blade for perforating the strip of sod may have a serrated edge with a multiplicity of relatively small individual teeth that form relatively short perforations in the sod separated by short inter-connecting portions of sod. Preferably, however, a notched cutter blade is used. FIGS. 17, 18 and 19 show two possible forms of notched cutter blade. The two blades are generally denoted by reference numerals 36' and 36" respectively.

Referring first to FIG. 17, blade 36' is a unitary blade in the form of a flat steel plate 216 having a pointed cutting edge 218 at the bottom. A series of holes 220 is provided along the top marginal portion of the plate 216 for receiving bolts used to secure the blade in its operative position in the sod harvester.

Cutting edge 218 is shaped to define a series of spaced notches 222. When the sod harvester is in operation, the portions of the blade represented by the notches 222 do not cut through the strip of sod. The sod is cut only by the portions of the cutting edge 218 between the notches, forming individual perforations through the sod.

Representative values for the dimensions indicated by the letters "d", "l", "w" and "x" are as follows:
Overall length of blade—16".

| d | l | w | x | number of "x" |
|---|---|---|---|---|
| 2" | 4.67" | 2" | 1½" | 2 |
| 2" | 4.67" | 1½" | 1 | 3 |
| 2" | 4.67" | .5" | .5" | 2 |

In practice, the representative values indicated above will be selected depending on the characteristics of the sod. In other words, different notch configurations will be required for different sod conditions. Weaker sod will need bigger notches for bigger interconnecting portions between the slabs, and stronger sod will need smaller notches so that the slabs can be more easily separated.

The shape and configuration of the blade 36' shown in FIG. 17 is of course fixed and cannot be changed Accordingly, it will be necessary to change the blade itself for a blade of different configuration when dealing with different sod conditions.

FIGS. 18 and 19 show an alternative form of blade (denoted 36") the configuration of which can be adjusted on site to accommodate different sod conditions.

Blade 36' comprises a main blade element 224 that is essentially the same as the blade 216 of FIG. 17 except that it has a straight bottom edge 226.

The actual cutting edge of the blade is formed by a series of individual blade segments 228 that extend in co-planar relationship to the main blade element 224, as shown in FIG. 19. A pair of C-shaped clamping members 230 are provided on respectively opposite sides of the blade and are coupled together by bolts 232 that extend through openings 234 in the main blade element 224. The clamping members 230 are tightened firmly against both the main blade element 224 and the individual blade segments 228 to retain the blade elements in co-planar relationship with the main blade element 224 and with the upper ends of the segments 228 firmly against the bottom edge 226 of element 224.

It will be appreciated that this arrangement allows for the configuration of the cutter blade to be changed relatively easily to provide different arrangements, spacings and widths of notches. As shown, each notch is of a width represented by a single blade element but obviously additional elements could be removed to increase the notch width. Conversely, the elements could be moved closer together to reduce the notch width.

Different forms of clamping means can of course be employed. For example, the segments 228 could be bolted directly to the main blade element 224.

In summary, the method of the invention combines the efficiency of automated roll-forming with the ease of laying that derives from the use of sod in the form of individual small slabs. As indicated previously, the method of the invention can be practised using different forms of self-harvester and with different dimensions of sod slabs. For example, the slabs could be delivered directly into a roll-forming unit. Where required, the slabs can be wrapped in netting or any other appropriate form of wrapping material.

I claim:

1. A method of harvesting sod, comprising the steps of:
providing a sod harvester which includes cutter means for forming a strip of sod as the harvester travels along a cutting path, and sod roll-forming means to which the strip of sod is delivered from the cutter means and which is adapted to form the strip of cut sod into a roll;
forming a strip of sod by causing said harvester to travel along said cutting path;
while forming said strip, perforating the sod transversely with respect to said cutting path at intervals selected to form a series of defined end-to-end slabs of sod;
delivering said series of slabs of sod to said roll-forming means and continuing formation of said roll until the roll comprises a unitary structure of multiple layers of slabs of sod which can be handled and transported to a laying site as a unit, and from which said slabs can subsequently be removed individually for laying.

2. A method as claimed in claim 1, wherein said step of perforating the sod transversely with respect to the cutting path at intervals selected to form a series of defined end-to-end slabs of sod comprises completely severing said strip to form discrete slabs of sod, and wherein the method further comprises the step of continuously introducing a wrapping material in advance of said roll-forming means and against a surface of said series of slabs of sod which will form the outer side of the roll in the roll-forming means, whereby the formed roll of sod comprises a said unitary structure of multiple layers of slabs of sod wrapped in said wrapping material.

3. A method as claimed in claim 1, wherein said step of perforating the sod transversely with respect to the cutting path at intervals selected to form a series of defined end-to-end slabs of sod comprises: forming a series of separate perforations through the sod transversely of said strip, so that the defined slabs of sod are not completely separated from one another but remain connected with portions of said strip between the perforations, whereby said unitary structure of multiple layers of slabs of sod comprising the roll is achieved as a result of inter-connection of successive said slabs of sod by said portions of the strip between the perforations.

4. A method as claimed in claim 3, wherein said step of perforating the sod transversely with respect to the cutting path at intervals selected to form a series of defined end-to-end slabs of sod is performed by providing said sod harvester with a transverse cutter blade having a cutting edge formed with a series of spaced notches that are dimensioned so that the notched portions of the blade do not perforate the sod, leaving said inter-connecting portions of the strip between the perforations.

5. A method as claimed in claim 4, wherein said notches are spaced and dimensioned according to the strength of the sod with the aim of maintaining said inter-connecting portions of the strip and avoiding separation of said slabs during subsequent formation of the roll of sod and subsequent handling and transportation of the roll.

6. A method as claimed in claim 4, wherein said cutter blade comprises a main blade element, a series of individual blade segments defining said cutting edge, and means removably coupling the blade segments to the main blade element so that the number of individual segments and the arrangement of the segments can be varied to change the configuration of the cutting edge of the blade to provide an appropriate distribution and configuration of said notches.

7. A method as claimed in claim 6, wherein said blade segments are disposed in co-planar relationship with said main blade element, and said coupling means comprises clamping elements extending along respectively opposite sides of said blade for clamping said blade segments in said co-planar relationship with the main blade element.

* * * * *